United States Patent [19]
Kasuga et al.

[11] Patent Number: 5,592,041
[45] Date of Patent: Jan. 7, 1997

[54] ULTRASONIC MOTOR AND ELECTRONIC APPARATUS EQUIPPED WITH ULTRASONIC MOTOR

[75] Inventors: Masao Kasuga; Kenji Suzuki; Makoto Suzuki; Minako Suzuki, all of Chiba, Japan

[73] Assignee: Seiko Instruments Inc., Japan

[21] Appl. No.: 324,736

[22] Filed: Oct. 18, 1994

[30] Foreign Application Priority Data

Oct. 21, 1993 [JP] Japan ................................. 5-263928
Sep. 6, 1994 [JP] Japan ................................. 6-213011

[51] Int. Cl.$^6$ ................................................ H01L 41/08
[52] U.S. Cl. ................................... 310/316; 310/323
[58] Field of Search ............................... 310/316, 317, 310/323, 328; 318/116

[56] References Cited

U.S. PATENT DOCUMENTS

| | | | |
|---|---|---|---|
| 4,510,411 | 4/1985 | Hakamata et al. | 310/316 |
| 5,134,348 | 7/1992 | Izukawa et al. | 318/116 |
| 5,229,678 | 7/1993 | Miyazawa | 310/323 |
| 5,343,108 | 8/1994 | Miyazawa et al. | 310/323 |
| 5,365,139 | 11/1994 | Kasuga et al. | 310/316 |
| 5,416,374 | 5/1995 | Inoue et al. | 310/317 |

FOREIGN PATENT DOCUMENTS

| | | |
|---|---|---|
| 0426042 | 5/1991 | European Pat. Off. . |
| 0562817 | 9/1993 | European Pat. Off. . |
| 3634329 | 4/1987 | Germany . |
| 2183371 | 6/1987 | United Kingdom . |

*Primary Examiner*—Mark O. Budd
*Attorney, Agent, or Firm*—Adams & Wilks

[57] ABSTRACT

An ultrasonic motor comprises a piezoelectric element having first and second surfaces. Electric patterns are disposed on the first surface of the piezoelectric element at nearly equal intervals in a multiple of four, with each pair of two neighboring electrode pattern corresponding to a region of the piezoelectric element which has an alternately reversed direction of polarization. First and second circuit devices short-circuit every other one of the electrode patterns to form two electrode pattern groups. A vibrating member is disposed on the second surface of and electrically connected to the piezoelectric element. Projections are disposed on the surface of the vibrating member near every other one of the boundaries of the electrode patterns. An oscillation driving circuit detects oscillation data from one of the electrode patterns short-circuited by the first circuit device, performs phase adjustment and amplification of the vibrating wave generated by the piezoelectric element, and inputs a driving signal to one of the electrode patterns short-circuited by the second circuit device. A moving member is movably disposed on the vibrating member, and a pressure-regulating member urges the moving member into pressure contact with the vibrating member.

20 Claims, 16 Drawing Sheets

ULTRASONIC MOTOR AND ELECTRONIC APPARATUS EQUIPPED WITH ULTRASONIC MOTOR

BACKGROUND OF THE INVENTION

The present invention relates to an ultrasonic motor and an electronic apparatus employing the ultrasonic motor for friction-driving a moving member by way of vibrating waves produced by utilizing the stretching movement of a piezoelectric element.

Conventionally, such an ultrasonic motor is known that a predetermined high frequency voltage is applied to the piezoelectric element fixed on the vibrating member to produce traveling waves, and the moving member attached in contact with the vibrating member under predetermined pressure is driven by the traveling waves.

Such a conventional structure is disclosed in, for instance, Japanese Laid-open patent application No. 58-148682.

Also, in FIG. 18, there is shown a cross-sectional view of a conventional analog type electronic timepiece. A stator 53 is arranged on the upper plane of the ground plate 40, and a magnetic core 52 is positioned in contact with the upper plane of this stator 53 and then is screwed thereon. A coil wire 51a is wound on the magnetic core 52 and is connected to a driving control circuit (not shown).

A rotor 54 is rotatably associated with a rotor hole 53a of the stator 53. The rotation of the rotor 54 is transported to a fifth wheel 55, a fourth wheel 44, a third wheel 43, a minute wheel 42, a rear wheel of data (not shown), and an hour wheel 45.

When a predetermined voltage is applied in a constant time period to a coil wire 51a, the rotor 54 is rotated by way of magnetic force of the stator 53, so that "hour" is displayed by the hour hand mounted on the hour wheel 45, "minute" is displayed by a minute hand 33 mounted on the minute wheel, and "second" is displayed by a second hand 34 mounted on the fourth wheel.

However, in case of the conventional traveling wave type ultrasonic motor, since two high frequency voltages having the different phases are inputted to the vibrating member so as to rotationally move the moving member, to thereby produce the traveling waves, two sets of the boosting circuit and the driving circuit are required.

Also, since the vibrating characteristics of the vibrating member and the piezoelectric element are changed in response to changes in the temperatures and the driving voltages, such a complex frequency following circuit is needed that the voltage, current, phase and the like applied to the motor are continuously sensitive to changes in the environments. As a consequence, although the structure of the ultrasonic motor is made simple, the driving circuits becomes very complex, whereby there is a problem that the conventional ultrasonic motor may be applied with difficulty to electronic apparatuses.

SUMMARY OF THE INVENTION

Therefore, the present invention has an object to provide a highly environment-reliable ultrasonic motor which is made compact, thin, and economical with improved stability.

To solve the above-described problems, an ultrasonic motor according to a first embodiment of the present invention comprises: a piezoelectric element so constructed in that electrode patterns are formed in substantially equiinterval on one plane, the number of said electrode patterns being a multiple of 4, and while two sets of electrode patterns located adjacent to each other are used as one pair, a polarization direction is alternately reversed for each pair of electrode patterns; first circuit means and second circuit means, which short-circuit every second electrode pattern to form two groups of the electrode patterns; projections arranged on the vibrating member every second electrode pattern near boundaries of the electrode patterns; an oscillating driving circuit for detecting oscillation information from a first electrode pattern short-circuited by the first circuit means to perform a phase control and an amplification process, and for inputting a drive signal into a second electrode pattern short-circuited by the second circuit means; forward and backward rotation signal generating means for generating a forward/backward rotation signal so as to set a rotation direction of the ultrasonic motor; a switching circuit for switching an operation to apply a drive frequency voltage and an operation to detect oscillation information with respect to the first electrode pattern short-circuited by the first circuit and also the second circuit means in response to the forward/backward rotation signal of the forward and backward rotation signal generating means; a moving member arranged in such a manner that the moving member is in contact with the vibrating member via the projection under application of certain pressure; and pressure regulating means arranged in such a manner that the moving member is in contact with the vibrating member under application of certain pressure. Accordingly, a highly environmentally reliable ultrasonic motor which is made compact, thin and economical with improved stability is obtained.

An ultrasonic motor according to a second embodiment of the present invention comprises: a piezoelectric element so constructed in that electrode patterns are formed in substantially equiinterval on one plane, the number of said electrode patterns being a multiple of 4, and while two sets of electrode patterns located adjacent to each other are used as one pair, a polarization direction is alternately reversed for each pair of electrode patterns; first circuit means and second circuit means, which short-circuit every second electrode pattern to form two groups of the electrode patterns; projections arranged on the vibrating member for every second electrode pattern near boundaries of the electrode patterns; an oscillating driving circuit for detecting oscillation information about the vibrating member and the piezoelectric element from the vibrating member to perform a phase control and an amplification process, and for inputting a drive signal into either the first electrode pattern short-circuited by the first circuit means or the second electrode pattern short-circuited by the second circuit means; forward and backward rotation signal generating means for generating a forward/backward rotation signal so as to set a rotation direction of the ultrasonic motor; a switching circuit for switching an operation to apply a drive frequency voltage with respect to the first electrode pattern short-circuited by the first circuit means and also the second electrode pattern short-circuited by the second circuit means in response to the forward/backward rotation signal of the forward and backward rotation signal generating means; a moving member arranged in such a manner that the moving member is in contact with the vibrating member via the projection under application of certain pressure; and pressure regulating means arranged in such a manner that the moving member is in contact with the vibrating member under application of certain pressure. A highly environmentally reliable ultrasonic motor is realized which is made compact, thin, and economical with improved stability.

As illustrated in FIG. 8, in the ultrasonic motor arranged as described above, in response to the forward/backward signal generating means 110 for generating the forward/backward signal to set the rotation signal of the ultrasonic motor, the vibration information about the vibrating member 101 and the piezoelectric element 102 is detected from the second electrode pattern 103b short-circuited by the second circuit means 104b. In the oscillating driving circuit 105, both of the phase shift control and amplification process are carried out based upon the detected vibrating information, and also the filtering process is performed by which the vibrating member 101 and the piezoelectric element 102 can be easily vibrated in a preselected vibration mode. Then, the drive signal is inputted into the first electrode pattern 103a short-circuited by the first circuit 104a. The vibrating waves are produced from the vibrating member 101 and the piezoelectric element 102 in response to this drive signal, and rotation movement is produced in the moving member 108 which is in contact with the vibrating member 101 and the piezoelectric element 102 via the projection 107 by the pressure applying means 109. To switch the rotation direction of the ultrasonic motor, the connecting conditions among the oscillating driving circuit 105, the first circuit means 104a, and the second circuit means 104b are changed by the switching circuit 106 in such a way that the vibrating information is detected from the first electrode pattern 103a short-circuited by the first circuit means 104a, and the drive frequency voltage is applied to the second electrode pattern 103b short-circuited by the second circuit means 104b.

Further, as represented in FIG. 11, in response to the forward/backward signal derived from the forward/backward signal generating means 110 for generating the forward/backward signal to set the rotation signal of the ultrasonic motor, the vibration information about the vibrating member 101 and the piezoelectric element 102 is detected from the vibrating member 101. In the oscillating driving circuit 105, both of the phase control and the amplification process are carried out based upon the detected vibrating information, and also the drive signal is inputted into the first electrode pattern 103a short-circuited by the first circuit means 104a. The vibrating waves are produced from the vibrating member 101 and the piezoelectric element 102 in response to this drive signal, and rotation movement is produced in the moving member 108 arranged in such a manner that the moving member 108 is in contact with the vibrating member 101 and the piezoelectric element 102 via the projection 107 by the pressure applying means 109. To switch the rotation direction of the ultrasonic motor, the connecting conditions among the oscillating driving circuit 405, the first circuit means 104a, and the second circuit means 104b are changed by the switching circuit 106 in such a way that the drive frequency voltage is applied to either the first electrode pattern 103a short-circuited by the first circuit means 104a, or the second electrode pattern 103b short-circuited by the second circuit means 104b in response to the drive signal outputted from the oscillating driving circuit 405.

DETAILED DESCRIPTION OF THE PREFERRED EMBODIMENTS

With reference to the drawings, embodiments of the present invention will now be explained.

(1) FIRST EMBODIMENT

Figure 1:
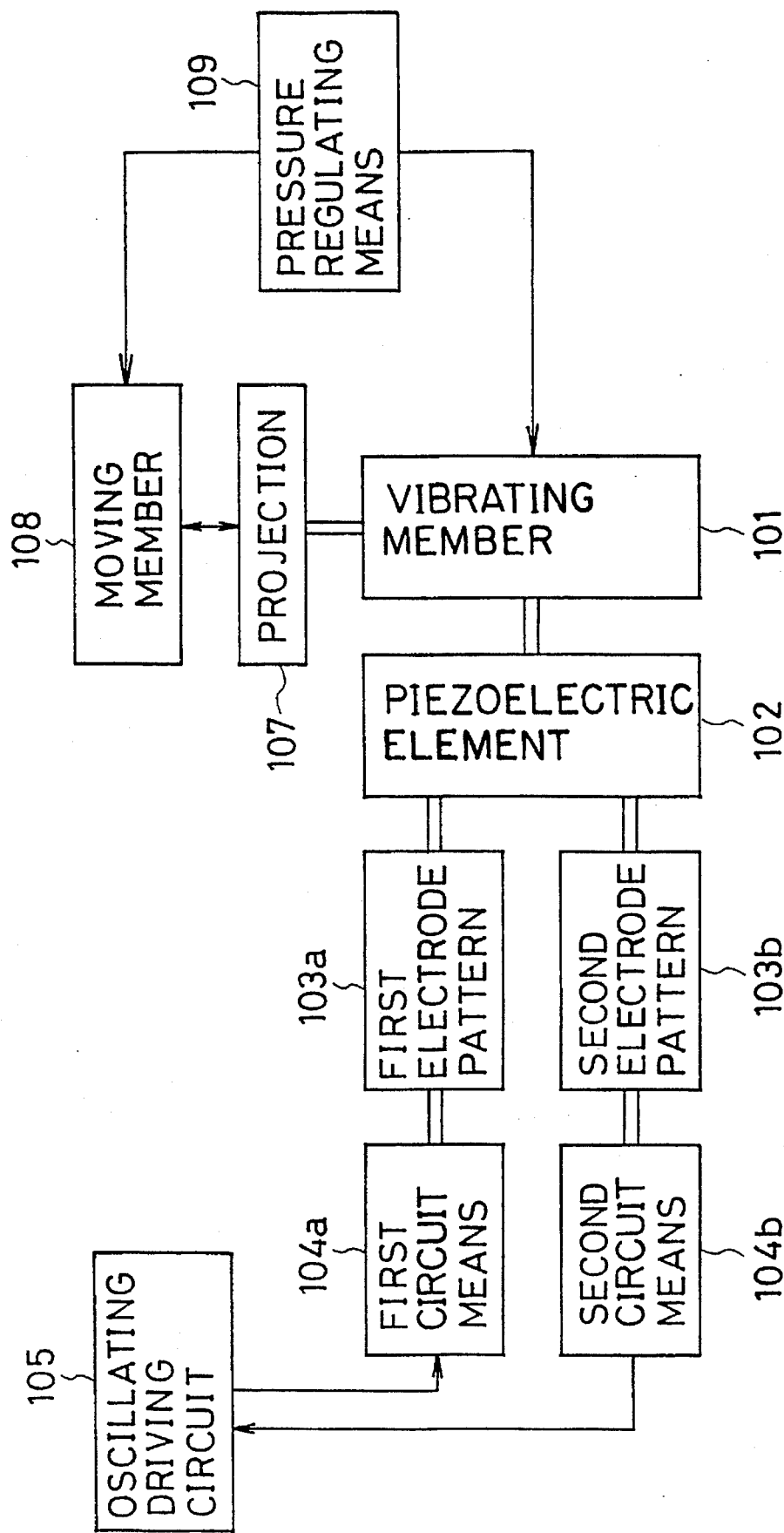
FIG. 1 is a block diagram of an ultrasonic motor according to a first embodiment of the present invention.
Figure 2:
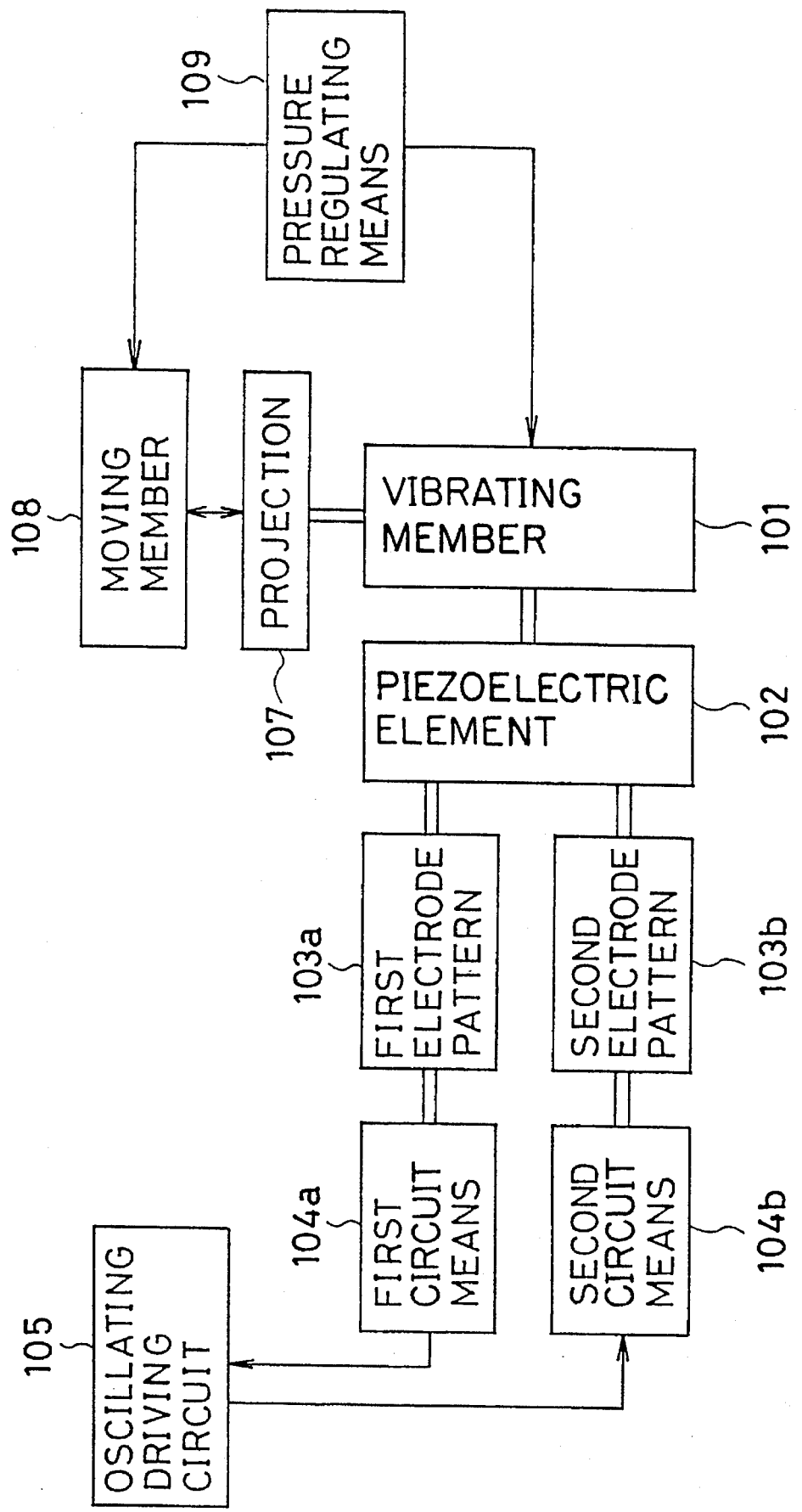
FIG. 2 is a block diagram of an ultrasonic motor according to a first embodiment of the present invention.

FIG. 1 and FIG. 2 are block diagrams of an ultrasonic motor according to a first embodiment of the present invention.

In FIG. 1, a piezoelectric element of the ultrasonic motor is so constructed in that electrode patterns 103a and 103b are formed at nearly equal intervals in a multiple of 4 on a first surface thereof. Each pair of two neighboring electrode patterns 103a and 103b corresponds to a region of the piezoelectric element and have an alternately reversed direction of polarization. A first circuit means 104a and a second circuit means 104b short-circuit every second electrode pattern among the electrode patterns 103a and 103b to form two electrode pattern groups. A disk-shaped vibrating member 101 is disposed on a second surface of and electrically connected to the piezoelectric element. Projections 107 of the vibrating members 101 are arranged near every other one of the boundaries of the electrode patterns 103a and 103b.

An oscillating driving circuit 105 detects oscillation information from the second electrode pattern 103b short-circuited by the first circuit means 104b to perform a phase control and an amplification process, and also outputs a drive signal to the first electrode pattern 103a short-circuited by the first circuit means 104a.

A moving member 108 is arranged in such a manner that the moving member 108 is in contact with the vibrating member 101 via the projection 107 under application of pressure. A pressure regulating means 109 applies pressure to the moving member 108 and the vibrating member 101.

The ultrasonic motor shown in FIG. 2 differs from the ultrasonic motor shown in FIG. 1 in that the oscillating driving circuit 105 detects oscillation information from the first electrode pattern 103a short-circuited by the first circuit means 104a to perform a phase control and an amplification process, and also outputs a drive signal to the second electrode pattern 103b short-circuited by the second circuit means 104b. The rotational direction of the ultrasonic motor shown in the structure of FIG. 1 is opposite to that shown in FIG. 2.

Figure 3:
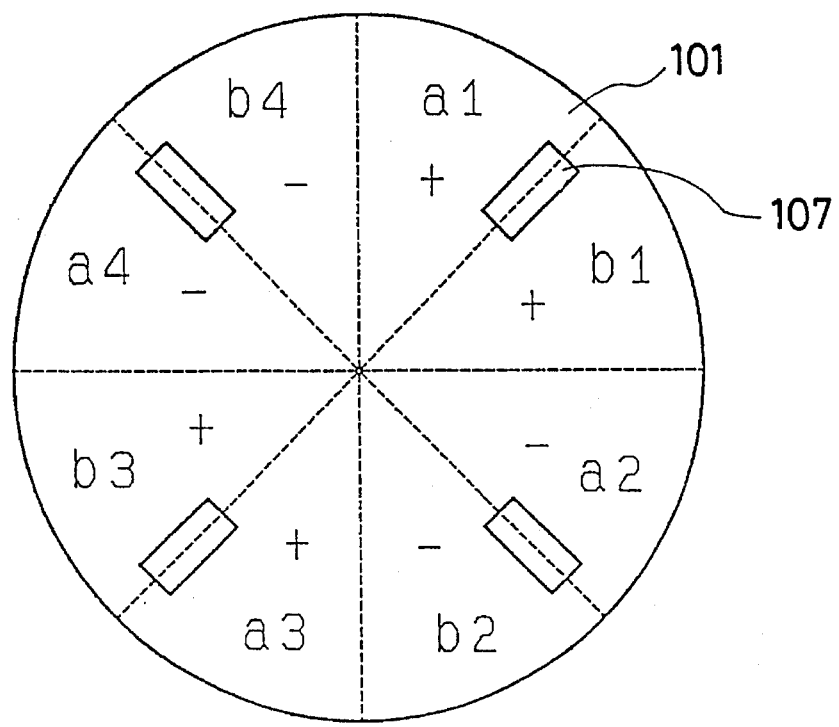
FIG. 3 is a plan view of the vibrating member of the ultrasonic motor according to the first embodiment of the present invention.
Figure 4:
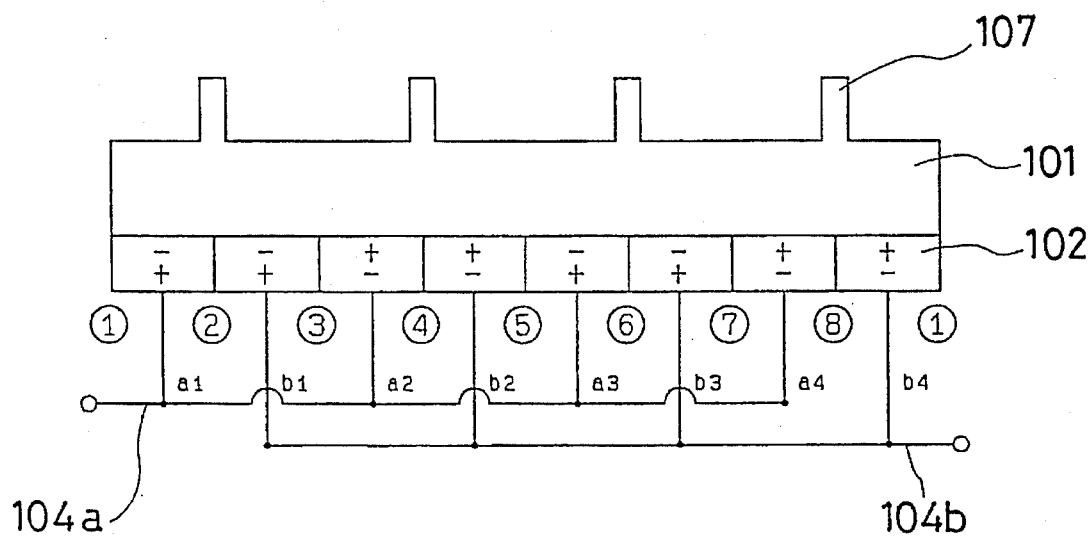
FIG. 4 is a sectional view of the vibrating member of the ultrasonic motor according to the first embodiment of the present invention.
Figure 5:
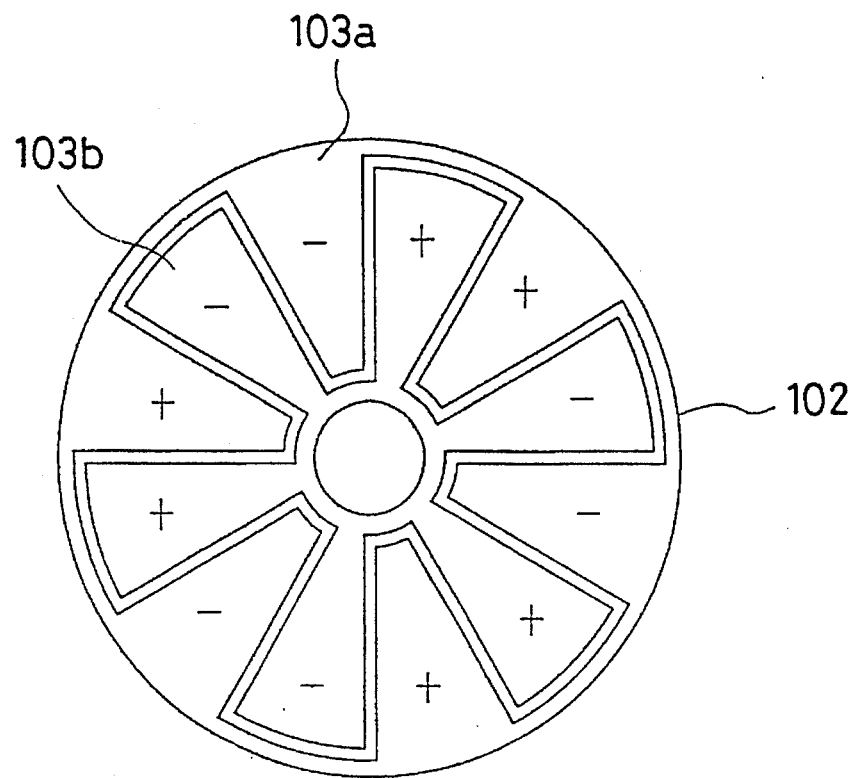
FIG. 5 is an electrode pattern diagram of the piezoelectric element of the ultrasonic motor according to the first embodiment of the present invention.

In the present invention, as shown in FIG. 3 and FIG. 4, oscillation of the vibrating waves is realized by means of the piezoelectric element 102 being adhered to the surface or plane of the disk-shaped vibrating member 101, and bonded by way of a thin film forming method, and then the stretching movement of the piezoelectric element 102 along the peripheral direction is converted into bending movement while forming the vibrating member 101 and the piezoelectric element 102. In this case, in accordance with this embodiment, as shown in FIG. 5, the polarization process is carried out by subdividing the piezoelectric element 102 along the peripheral direction to form the first electrode pattern 103a and the second electrode pattern 103b for every second subdivided piezoelectric element. Then, there is shown such a case that two waves are oscillated along the peripheral direction.

It should be noted that symbols (+) and (−) shown in FIGS. 3–5 indicate the polarization directions, namely, symbol (+) implies that the polarization process is carried out by applying a positive electric field on the side of bonding plane of the piezoelectric element 102 to the vibrating member 101, whereas symbol (−) implies that the polarization process is performed by applying a negative electric field thereto. The piezoelectric element 102 may be formed by arranging 8-subdivided electrode patterns 103a and 103b on a disk-shaped piezoelectric element, or by arranging 8-subdivided fan-shaped piezoelectric elements. The ultrasonic motor according to the present invention can be realized by the projection 107 being formed for every second electrode pattern on the boundary between the first electrode pattern 103a and the second electrode pattern 103b; both the first electrode pattern 103a and the second electrode pattern 103b being connected by a first circuit means 104a and a second circuit means 104b; and a high frequency voltage derived from an oscillating driving circuit (not shown) is applied to the first and second electrode patterns 103a and 103b. Furthermore, the ultrasonic motor may be driven in the reverse direction when the application of the high frequency voltage to the first electrode pattern 103a and the second electrode pattern 103b is switched by a switching circuit (not shown).

FIG. 4 illustrates the vibrating member 101 and the projection 107 by way of a sectional view in order to explain them more concretely. Assuming now under this condition that connections of the respective piezoelectric elements a1, a2, a3, and a4 correspond to the first circuit means 104a, and connections of the respective piezoelectric elements b1, b2, b3 and b4 correspond to the second circuit means 104b, since the phase of the vibrating wave vibrated in the vibrating member 101 is shifted by 90 degrees by applying the frequency voltage from the frequency voltage generating apparatus to either the first circuit means 104a, or the second circuit means 104b by way of the switching means (not shown), the driving direction of the moving member (not shown) can be changed over.

FIG. 5 schematically shows an electrode pattern of the piezoelectric element employed in the ultrasonic motor according to the first embodiment of the present invention, which is one of the concrete embodiments applicable to the piezoelectric elements shown in FIG. 1 to FIG. 4. That is, it is required in the previous embodiment to connect every second electrode patterns since the electrode patterns are provided which are subdivided by the number equal to 4 times longer than the desired vibrating wave number along the peripheral direction.

In general, soldering and welding processes are employed to derive a lead wire. There are several difficulties during the manufacturing stages, and also vibration leakages as well as increases in loss with respect to such a structure that all of the subdivided electrode patterns are conducted by the lead wires. Therefore, in accordance with this embodiment, after the 12-subdivided electrode patterns have been previously formed on the piezoelectric element 102 by way of such thin-film forming means as vapor deposition, sputtering, and printing, the polarization process is executed as shown in the drawings. Subsequently, every second electrode pattern of the first electrode pattern 103a and the second electrode pattern 103b are connected by employing again the thin-film forming means, so that the motor performance and the manufacturing effects could be improved. In accordance with the present embodiment, only two lead wires are sufficient irrelevant to the number of vibrating waves. Although the present embodiment represents such a case that the number of vibrating waves is 3, the present invention may be readily realized in any other cases other than the case that the number of vibrating waves is 2 as shown in FIG. 3 and FIG. 4.

Figure 6:
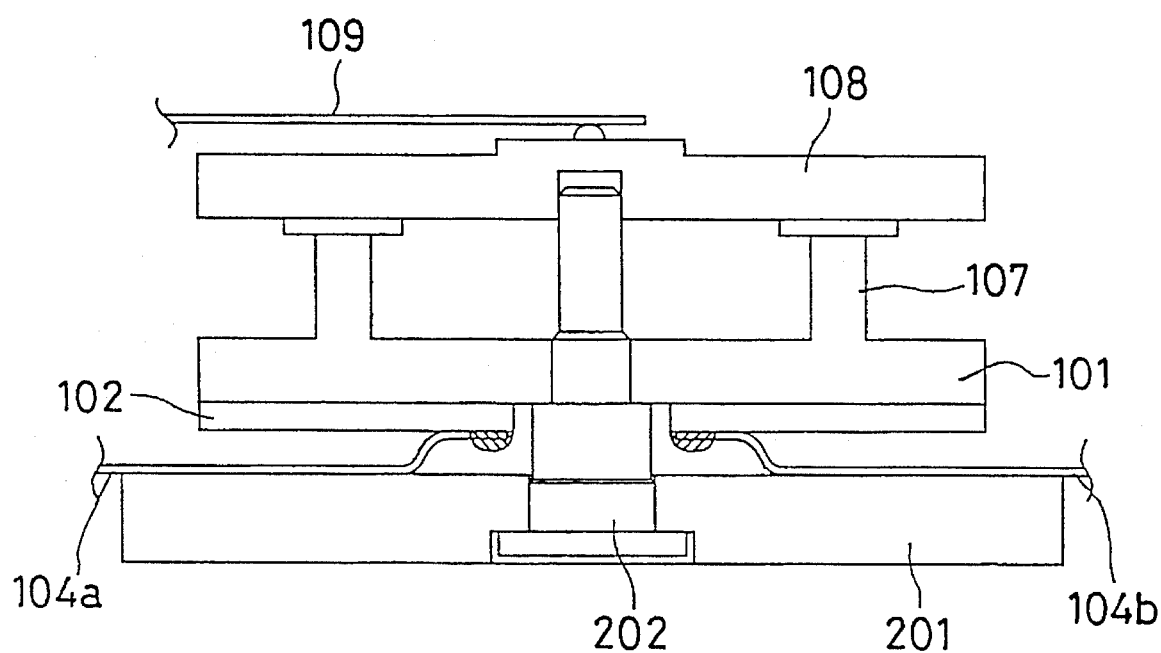
FIG. 6 is a longitudinal sectional view of the ultrasonic motor according to the first embodiment of the present invention.

In FIG. 6, a central shaft 202 is fixed on a base or fixing plate 201. The piezoelectric element 102 having the first electrode pattern 103a and the second electrode pattern 103b is adhered to the vibrating member 101, and this piezoelectric element 102 is fixed/supported near the central portion in such a manner that the piezoelectric element is made in an integral form together with the fixing plate 201 by the central shaft 202. The moving member 108 is rotatably guided by the central shaft 202, and is in contact with the projection 107 formed on the vibrating member 101 under preselected pressure by a pressure applying spring 109 whose one end is fixed/supported on an external component (not shown).

Figure 7:
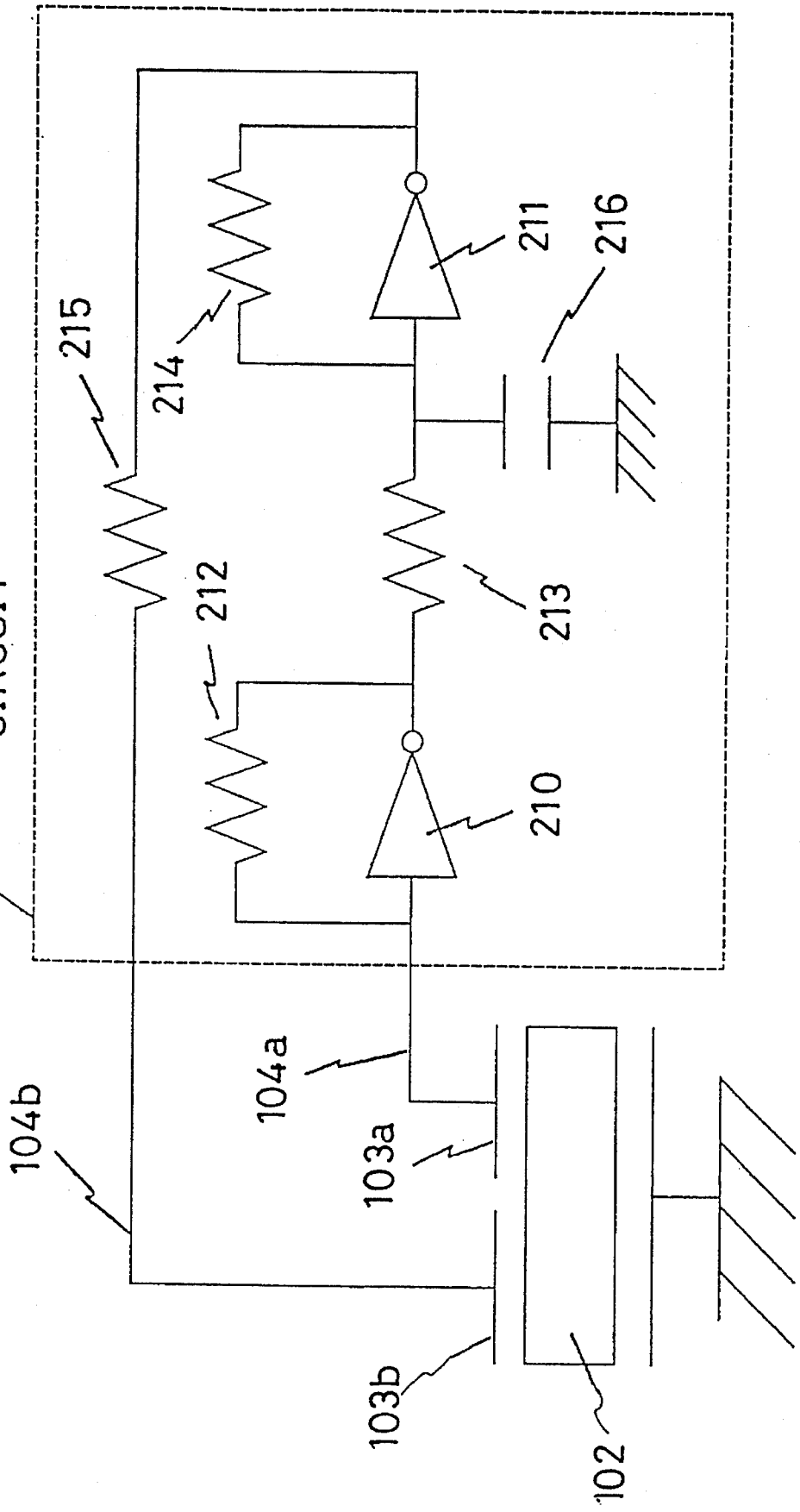
FIG. 7 is an oscillating driving circuit diagram of the ultrasonic motor according to the first embodiment of the present invention.

In FIG. 7, the oscillating driving circuit detects the oscillation information from the first electrode pattern 103 short-circuited by the first circuit means 104a. An inverter 210 is connected in parallel to a resistor 212. Both the inverter 210 and the resistor 212 invert and amplify a signal.

A resistor 213 constitutes an integrating circuit together with a capacitor 216. An inverter 211 is connected in parallel to a resistor 214. The inverter 211 and the resistor 214 invert and amplify a signal. The resistor 213, the capacitor 216, the inverter 211 and the resistor 214 constitute a phase shifter. A resistor 215 performing a signal smoothing process.

The oscillating driving circuit 105 performs a phase shift control and an amplification process. The signal which has been smoothened causes the second electrode pattern 103b shortcircuited by the second circuit means 104b to output a drive signal.

It should be noted that a filter circuit (not shown) is employed if required, whereby a filter process can be performed for easily oscillating the vibrating member 101 and the piezoelectric element 102 in the desired vibrating mode.

It should also be noted that although the signal inverting and amplifying operation is carried out by employing the inverter in this embodiment, a signal non-inverting and amplifying operation may be performed by utilizing a comparator.

(2) SECOND EMBODIMENT

In a second embodiment of the present invention, a structure of a vibrating member is indicated in FIG. 3 and FIG. 4 of the first embodiment, and the structure of the ultrasonic motor shown in FIG. 6 of the first embodiment is similarly applicable to that of this second embodiment. Also, the circuit arrangement of the first embodiment shown in FIG. 7 is similarly applicable as a circuit arrangement of an oscillating driving circuit of the ultrasonic motor. Therefore, only the differences between the first and second embodiments will now be explained.

Figure 8:
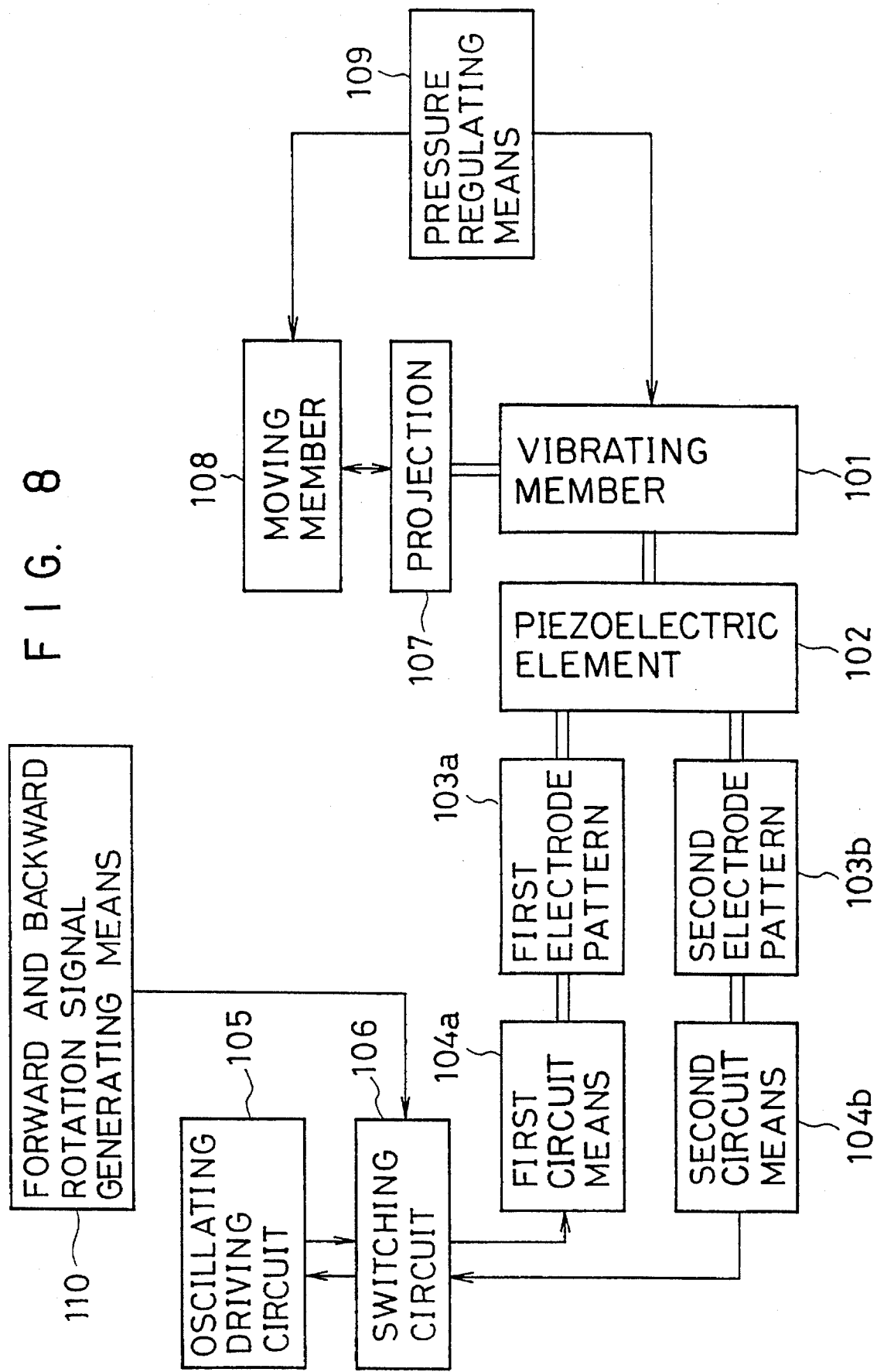
FIG. 8 is a block diagram of an ultrasonic motor according to a second embodiment of the present invention.

In FIG. 8, in response to a forward/backward direction issued from a forward/backward rotation signal generating means 110 for generating the forward/backward rotation signal used to set the rotation direction of the ultrasonic motor, oscillation information about the vibrating member 101 and the piezoelectric element 102 is detected from the second electrode pattern 103b shortcircuited by the second circuit means 104b. Based upon the detected oscillation information, in an oscillating driving circuit 105, both a phase shift control and an amplification process are performed, and also a filtering process is carried out in order to easily oscillate the vibrating member 101 and the piezoelectric element 102 in the desirable vibrating mode. Then, a drive signal is inputted into the first electrode pattern 103a shortcircuited by the first circuit means 104a. In response to this drive signal, the vibrating waves are oscillated in the vibrating member 101 and the piezoelectric element 102, and the rotation movement is produced in the moving member 108 arranged in such a manner that this moving member is in contact with the vibrating member 101 via the projection 107 formed on the vibrating member 101 by a pressure regulating means 109 under application of pressure.

To switch the rotation direction of the ultrasonic motor, the connecting conditions among the oscillating driving circuit 105, the first circuit means 104a, and the second circuit means 104b may be changed by a switching circuit 106 in such a manner that the oscillation information is detected from the first electrode pattern shortcircuited by the first circuit means 104a, and a drive frequency voltage is applied to the second electrode pattern 103b short-circuited by the second circuit means 104b.

(3) THIRD EMBODIMENT

In a third embodiment of the present invention, a structure of a vibrating member is indicated in FIG. 3 and FIG. 4 of the first embodiment, and the structure of the ultrasonic motor shown in FIG. 6 of the first embodiment is similarly applicable to that of this third embodiment. Therefore, only the differences between the first and third embodiments will now be explained.

Figure 9:
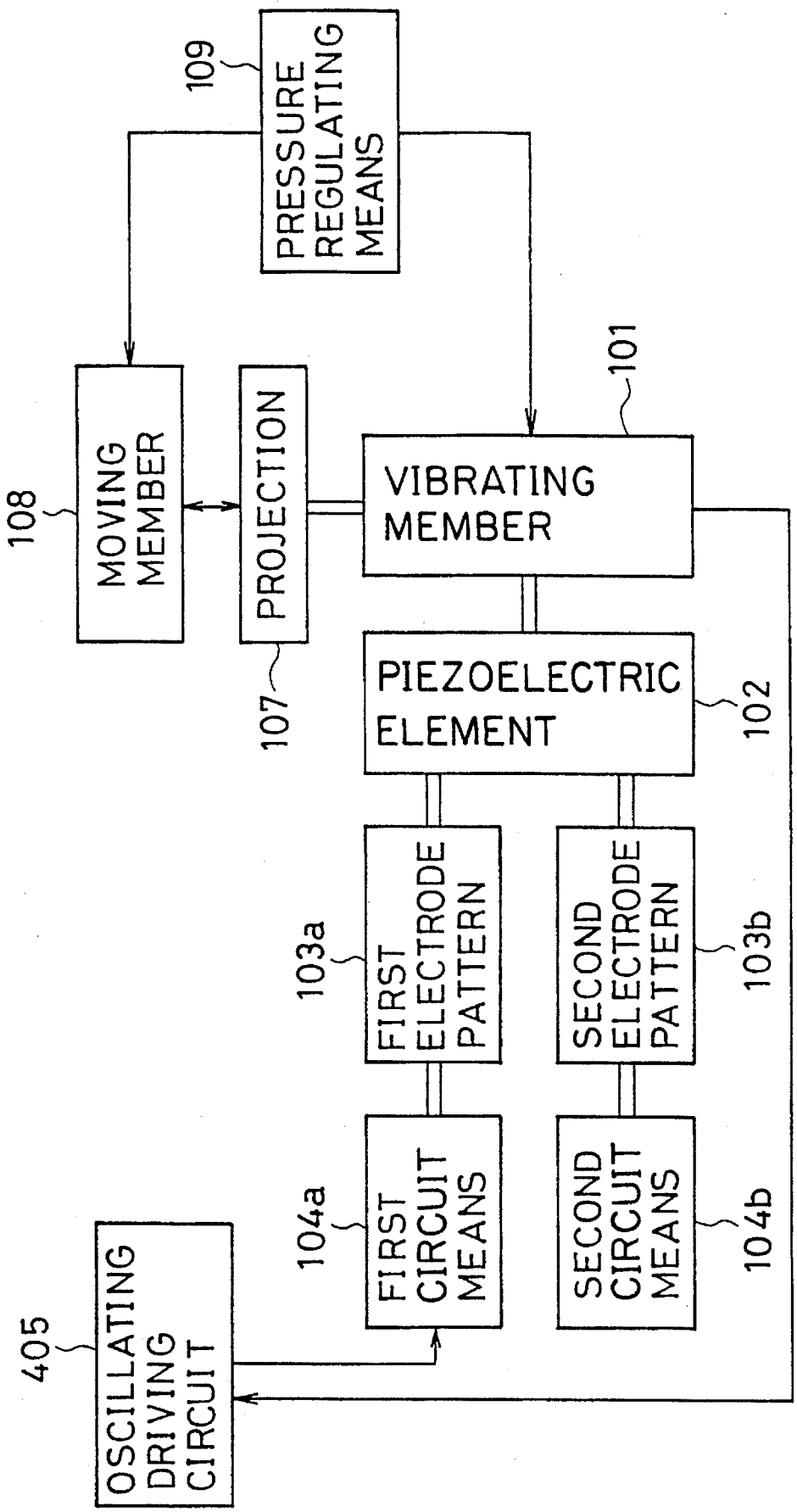
FIG. 9 is a block diagram of an ultrasonic motor according to a third embodiment of the present invention.

In FIG. 9, a piezoelectric element 102 of the ultrasonic motor is so constructed in that electrode patterns 103a and 103b are formed in a substantially equiinterval on one surface or plane thereof, the number of the electrode patterns is a multiple of 4, and while two sets of the electrode patterns 103a and 103b located adjacent to each other are used as one pair, a polarization direction is alternately reversed for each pair of electrode patterns. A first circuit means 104a and a second circuit means 104b shortcircuit every second electrode pattern among the first and second electrode patterns 103a and 103b to form two groups of the electrode patterns. A vibrating member 101 is bonded on a plane opposite to the plane on which the electrode patterns 103a and 103b of the piezoelectric element 102 are formed, and is electrically connected to the piezoelectric element 102. A projection 107 of the vibrating member 101 is arranged on the vibrating member 101 for every second electrode pattern near boundaries of the electrode patterns 103a and 103b.

An oscillating driving circuit 405 detects oscillation information about the vibrating member 101 and the piezoelectric element 102 from the vibrating member 101 to perform a phase control and an amplification process, and inputs a drive signal to vibrate the vibrating element 101 and the piezoelectric element 102 into the first electrode pattern 103a shortcircuited by the first circuit means 104a. A moving member 108 is arranged in such a manner that the moving member 108 is in contact with the vibrating member 101 via the projection 107 under application of certain pressure. A pressure regulating means 109 is arranged in such a manner that the moving member 108 is in contact with the vibrating member 101 under application of certain pressure.

A difference between the third embodiment and the first embodiment is the arrangement of the oscillating driving circuit 405 in that since the oscillation information about the vibrating member 101 and the piezoelectric element 102 is detected from the vibrating member 101 in this embodiment, the vibrating member 101 is not electrically grounded. It should be noted that although the oscillation information about the vibrating member 101 and the piezoelectric element 102 is detected in this embodiment, the oscillation information about the vibrating member 101 and the piezoelectric element 102 may be detected from the electrode pattern 103c formed on the plane opposite to the plane on which the electrode patterns 103a and 103b of the piezoelectric element 102 are formed.

Figure 10:
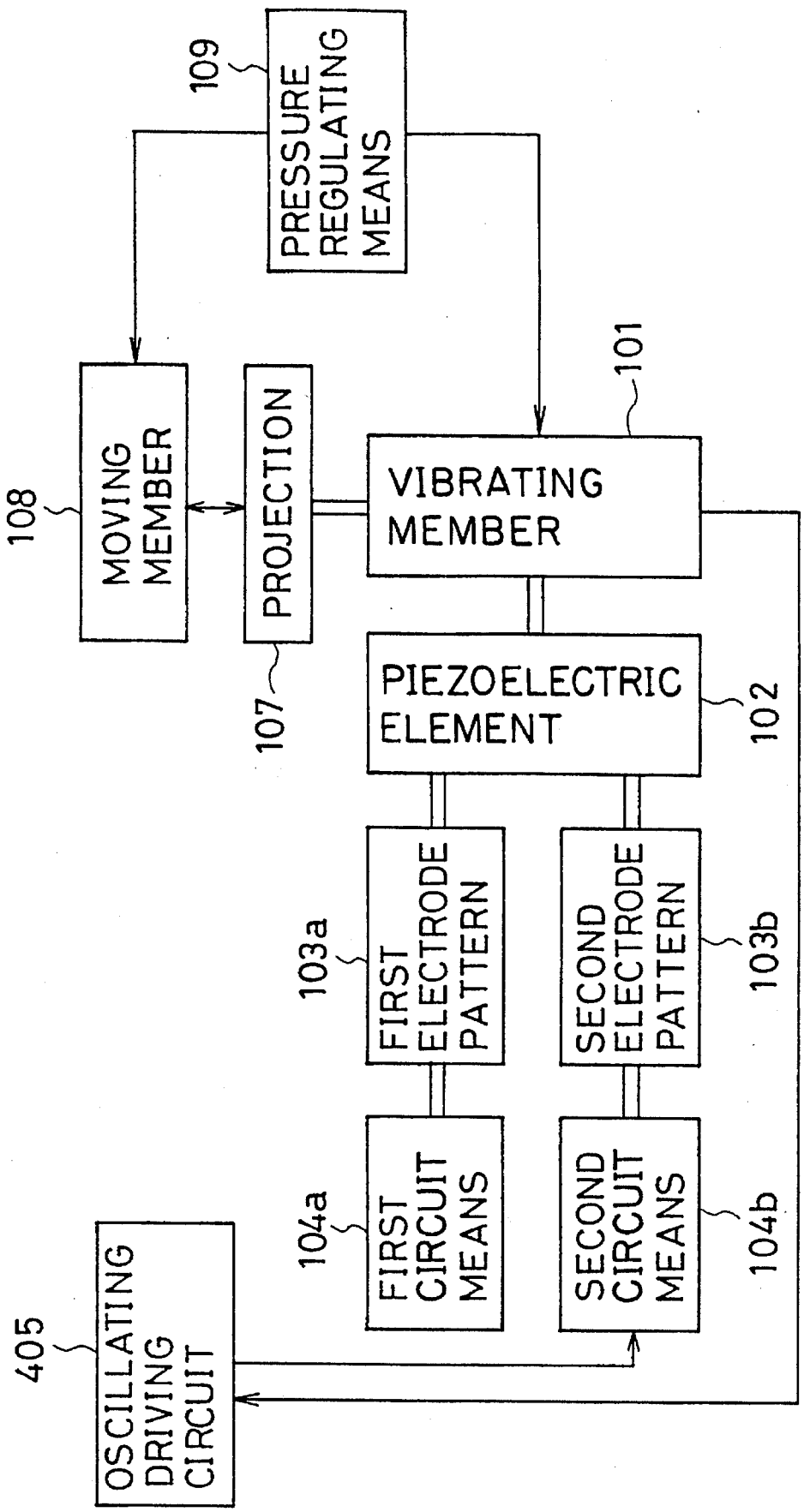
FIG. 10 is a block diagram of an ultrasonic motor according to a third embodiment of the present invention.

FIG. 10 differs with FIG. 9 in that the oscillating driving circuit 405 detects the oscillation information of the vibrating member 101 and the piezoelectric element 102 is detected from the vibrating member 101 to perform the phase control and the amplification process, and also outputs the drive signal to the second electrode pattern 103b shortcircuited by the second circuit means 104b. The rotational direction of the ultrasonic motor employed in the FIG. 10 is reverse with respect to that of FIG. 9.

(4) FOURTH EMBODIMENT

Also, in a fourth embodiment of the present invention, a structure of a vibrating member is shown in FIG. 3 and FIG. 4, and a structure of an ultrasonic motor is applicable to that shown in FIG. 6 of the first embodiment. Only differences between the fourth embodiment and the first embodiment will now be explained.

Figure 11:
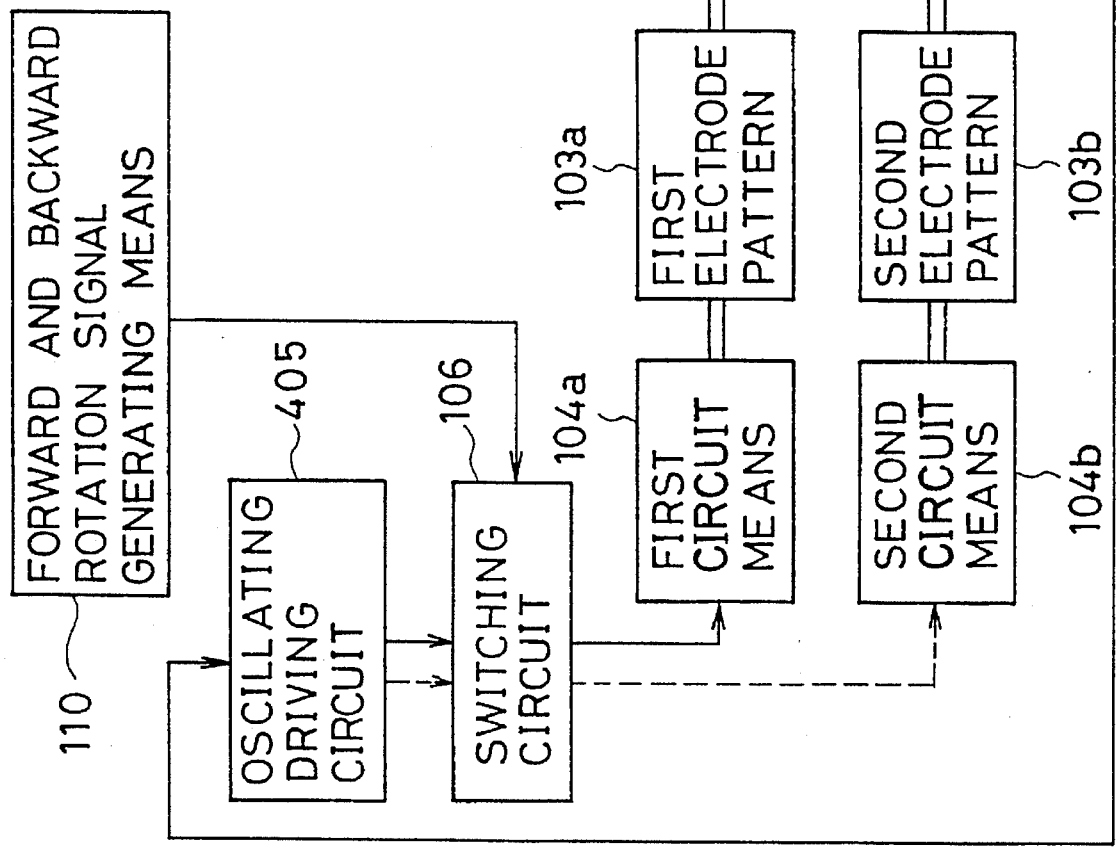
FIG. 11 is a block diagram of an ultrasonic motor according to a fourth embodiment of the present invention.

In FIG. 11, in response to a forward/backward rotation signal derived from a forward/backward rotation signal generating means 110 used to produce the forward/backward rotation signal for setting the rotation of the ultrasonic motor, the oscillation information about the vibrating member 101 and the piezoelectric element 102 is detected from the vibrating element 101. Based on the detected oscillation information, a phase control and an amplification process are carried out in the oscillating driving circuit 405, and a drive signal is entered into the first electrode pattern 103a shortcircuited by the first circuit means 104a. In response to this drive signal, vibrating waves are oscillated from the vibrating member 101 and the piezoelectric element 102, and then rotational movement is produced in the moving member 108 which is arranged in contact with the vibrating member 101 and to which pressure is applied via the projection 107 formed on the vibrating member 101 by the pressure regulating means 109.

To switch the rotation direction of the ultrasonic motor, the connecting conditions among the oscillating driving circuit 405, the first circuit means 104a, and the second circuit means 104b may be changed by a switching circuit 106 in such a manner that, as shown by a dotted line of this figure, a drive frequency voltage is applied to the second electrode pattern 103b shortcircuited by the second circuit means 104b.

Figure 12:
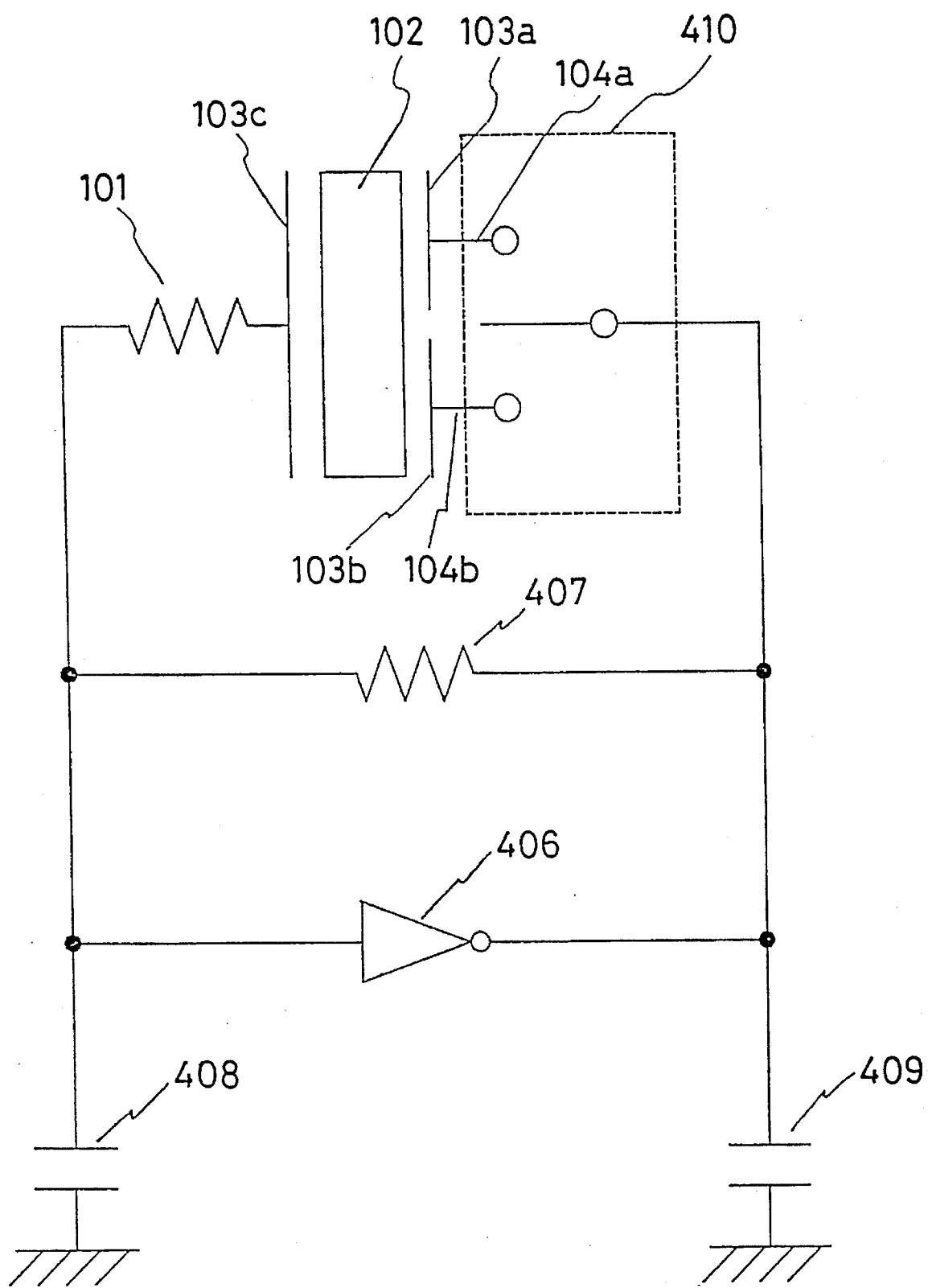
FIG. 12 is an oscillating driving circuit of the ultrasonic motor according to the third and fourth embodiments of the present invention.

In FIG. 12, an inverter 406 connected in parallel to the vibrating member 101 and the piezoelectric element 102 inverts and amplifies the oscillation information of the vibrating member 101 and the piezoelectric element 102 which is detected as an electric signal from the vibrating member 101. The detected electric signal is supplied to any one of the first electrode pattern 103a shortcircuited by the first circuit means 104a and the second electrode pattern 103b shortcircuited by the second circuit means 104b. A resistor 407 connected in parallel to the inverter 406 is a feedback resistor for stabilizing the operating point of the inverter 406. Furthermore, a capacitor 408 and a capacitor 409 which are connected in series to the respective input and output terminals of the inverter 406 control the phases within the circuit. It should be understood that a resistor for lowering a high frequency gain is interposed between the capacitor 409 and the output terminal of the inverter 406, so that extraordinary oscillations may be suppressed.

Furthermore, a changing switch 410 functioning as a switching circuit changes the connection conditions between the output terminal of the inverter 406 and any one electrode pattern from the first electrode pattern 103a shortcircuited by the first circuit means 104a and the second electrode pattern 103b shortcircuited by the second circuit means 104b in response to the forward/backward rotation signal outputted from the forward/backward rotation signal generating means 110 shown in FIG. 11, so that the moving direction of the moving member 108 may be switched. In this case, either the first circuit means 104a, or the second circuit means 104b, which is not connected to the oscillating driving circuit 405, may be maintained under an electrically floating condition, or may otherwise be connected via a capacitive element such as a capacitor to the vibrating member 101. It should be noted that although the oscillation information about the vibrating member 101 and the piezoelectric element 102 is detected from the vibrating member 101 in this embodiment, the oscillation information about the vibrating member 101 and the piezoelectric element 102 may be detected from the electrode pattern 103c formed on the plane opposite to the plane where the electrode patterns 103a and 103b of the piezoelectric element 102 are formed.

Also, it is possible to realize a more stable driving operation by the capacitance values of the capacitor 408 and the capacitor 409 for controlling the phase in the oscillating driving circuit 405 being variable, and furthermore the resistance value of the resistor 407 is variable, whereby at least one of the capacitor 408, 409 and resistor 407 is variably controlled by a motor control circuit 112 (not shown) for stably driving the motor based upon the output signal derived from the detecting means for detecting the rotational information of the moving member 108. More concretely speaking, a plurality of capacitors 408 as well as capacitors 409 are connected in parallel to each other, and then the connection condition thereof is varied. Also, at least one of the capacitor 408, 409 and resistor 407 may be variably controlled by the motor control circuit 112 by detecting not only the rotational information about the moving member 108, but also environment temperatures/ driving voltages and so on.

(5) FIFTH EMBODIMENT

Figure 13:
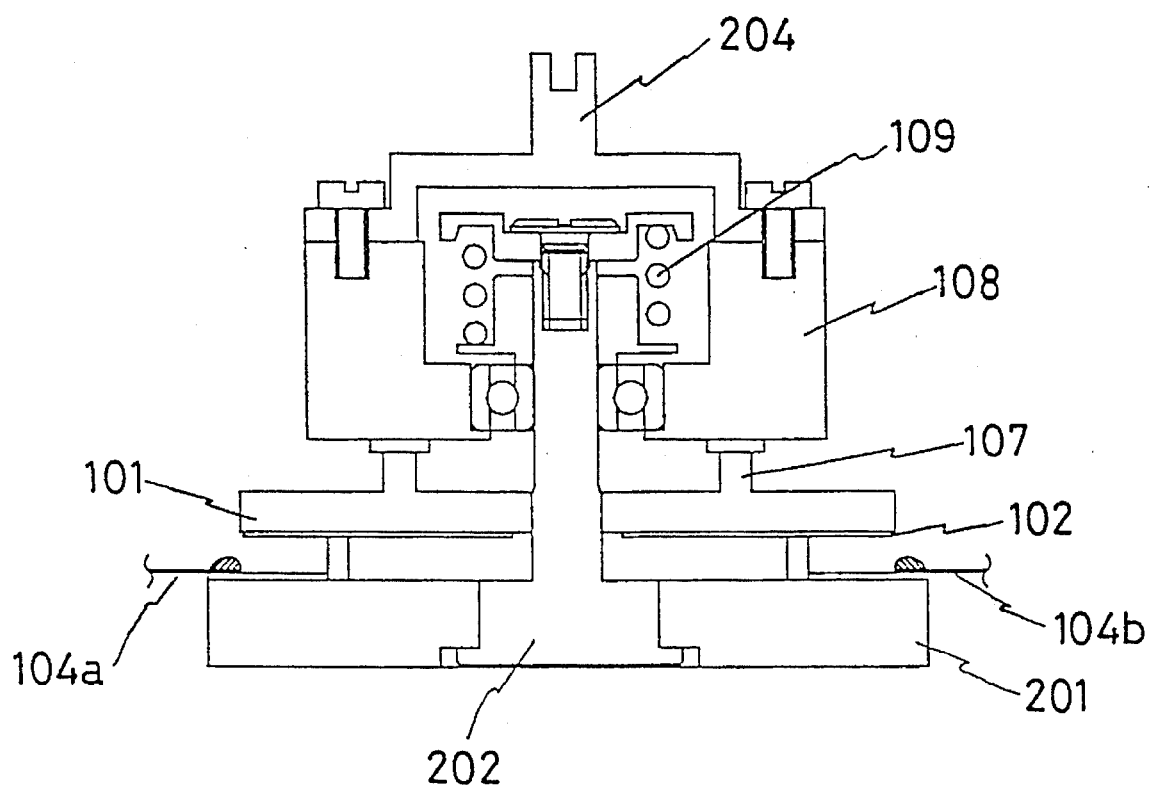
FIG. 13 is a longitudinal sectional view of an ultrasonic motor driving apparatus according to a fifth embodiment of the present invention.

In FIG. 13, a center shaft 202 is fixed on a fixing plate 201. The piezoelectric element 102 is adhered to the vibrating member 101, and is fixed/supported by the center shaft 202 near a central portion in such a manner that the piezoelectric element 102 is formed in an integral form with the fixing plate 201. The moving member 108 supports an output shaft 204 and power transmission means such as a gear and a friction wheel (not shown), which transfer torque from the output shaft 204.

The moving member 108 is in contact with the vibrating member 101 under preselected pressure by a pressure regulating spring 109, and is rotatable. In this embodiment, as conducting means to the first electrode pattern 103a and the second electrode pattern 103b, a conducting member is provided near the nodes other than the central portions of the vibrating member 101 and the piezoelectric element 102, and also an elastic supporting member 203 functioning a supporter are employed. With such a structure, the electrical conduction with each of the subdivided electric patterns may be realized without employing such a conducting shortcircuiting pattern as shown in FIG. 5.

Here, either the oscillating driving circuit 105, or the oscillating driving circuit 405 (not shown) supply to either the first electrode pattern 103a, or the second electrode pattern 103b, such a drive signal having a single node other than the central portions of the vibrating member 101 and the piezoelectric element 102 with respect to the radial direction. By applying the drive signal, vibrating waves are produced in the vibrating member 101 and then rotation movement is produced. Furthermore, power of the motor is derived by the output shaft 204 provided on the moving member 108 and the power transmitting means 205 such as a gear (not shown).

(6) SIXTH EMBODIMENT

Figure 14:
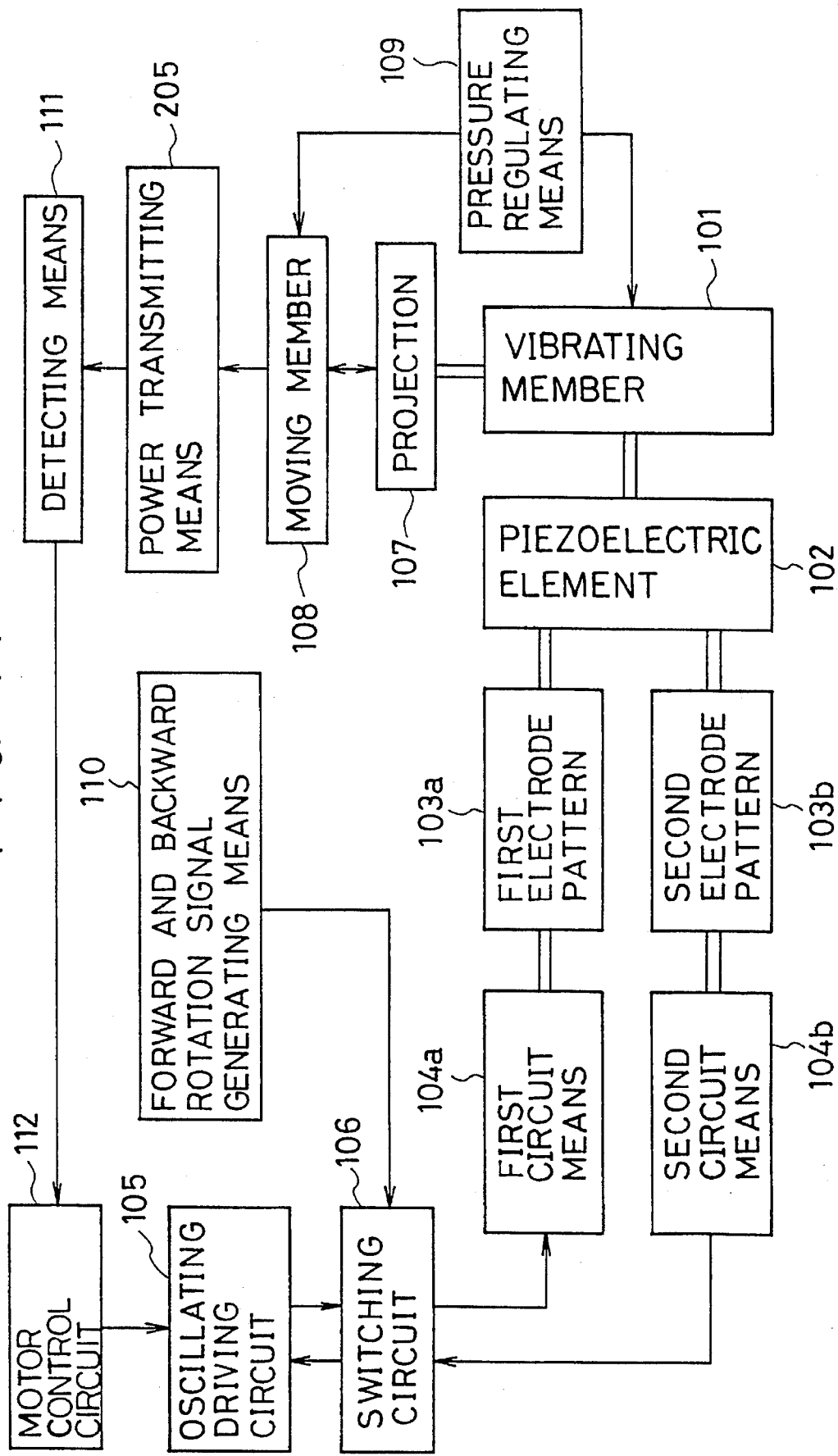
FIG. 14 is a block diagram of an ultrasonic motor according to a sixth embodiment of the present invention.

In FIG. 14, a detecting means 111 detects rotational information of the moving member 108. A motor control circuit 112 controls the operation of the oscillating driving circuit 405, or the oscillating driving circuit 305 so as to determine the drive condition of the ultrasonic motor in response to the detection signal of the detecting means 111.

(7) SEVENTH EMBODIMENT

Figure 15:
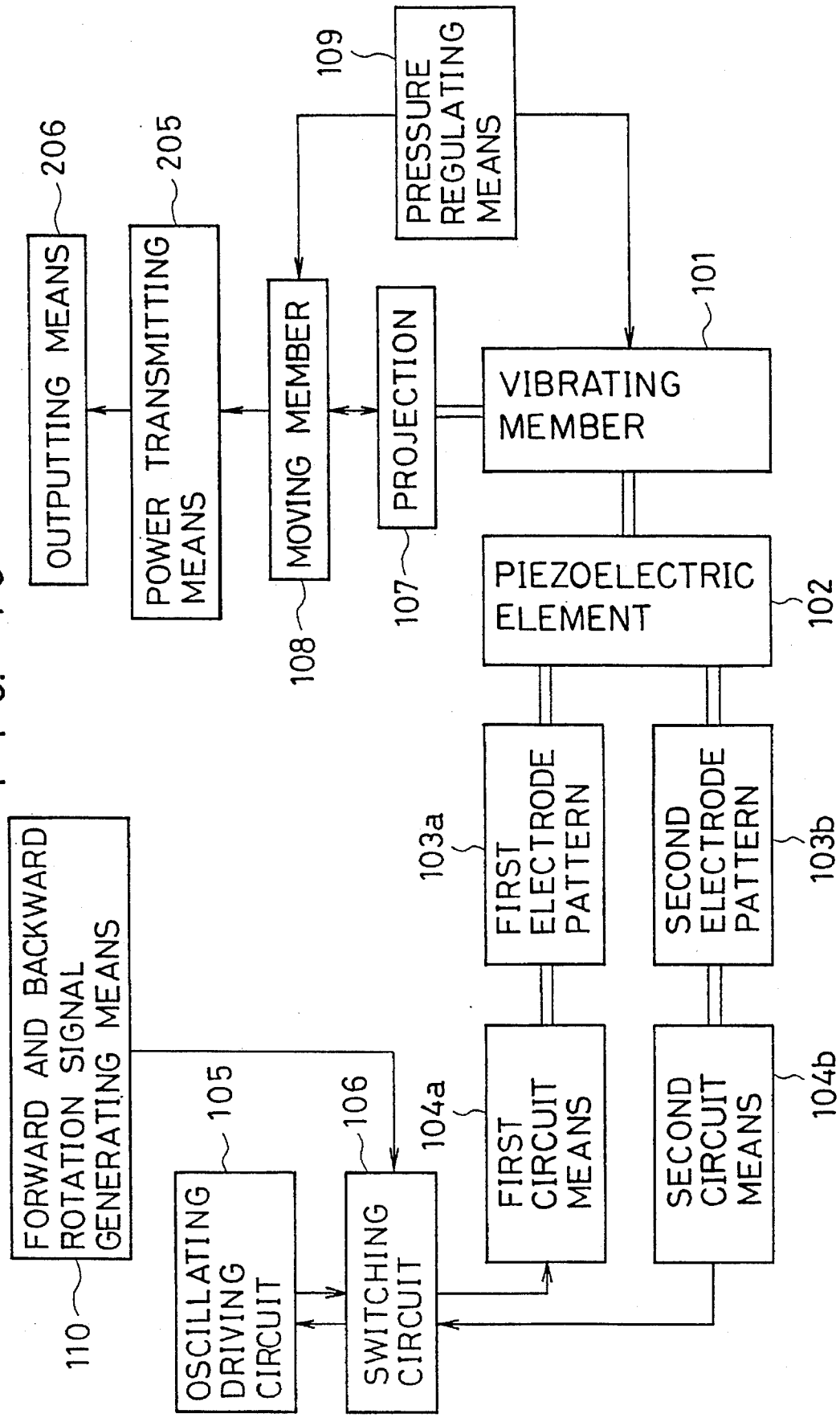
FIG. 15 is a block diagram of an electronic apparatus equipped with an ultrasonic motor according to a seventh embodiment of the present invention.

In FIG. 15, with employment of the ultrasonic motor shown in the previous embodiment, the electronic apparatus equipped with the ultrasonic motor may be realized by way such an arrangement for employing a power transmitting means 205 operated in an integral form with the moving member 108 of the ultrasonic motor, and an outputting means 206 operated in response to the operation of the power transmitting means 205.

As the power transmitting means 205, such a power transmission wheel as a gear, a friction wheel and the like is preferably employed.

Preferably, as the outputting means 206, a hand is employed in an electronic timepiece; an automatic focusing mechanism and a film take-up apparatus are employed in a camera; a cutting tool feeding apparatus and a machining member feeding apparatus are used in a tooling machine; and an arm and the like are employed in a robot.

As the electronic apparatus equipped with the ultrasonic motor according to the present invention, preferably, an electronic timepiece, a camera, a printer, a printing machine, a tooling machine, a robot, and a transport apparatus may be realized.

(8) EIGHTH EMBODIMENT

Figure 16:
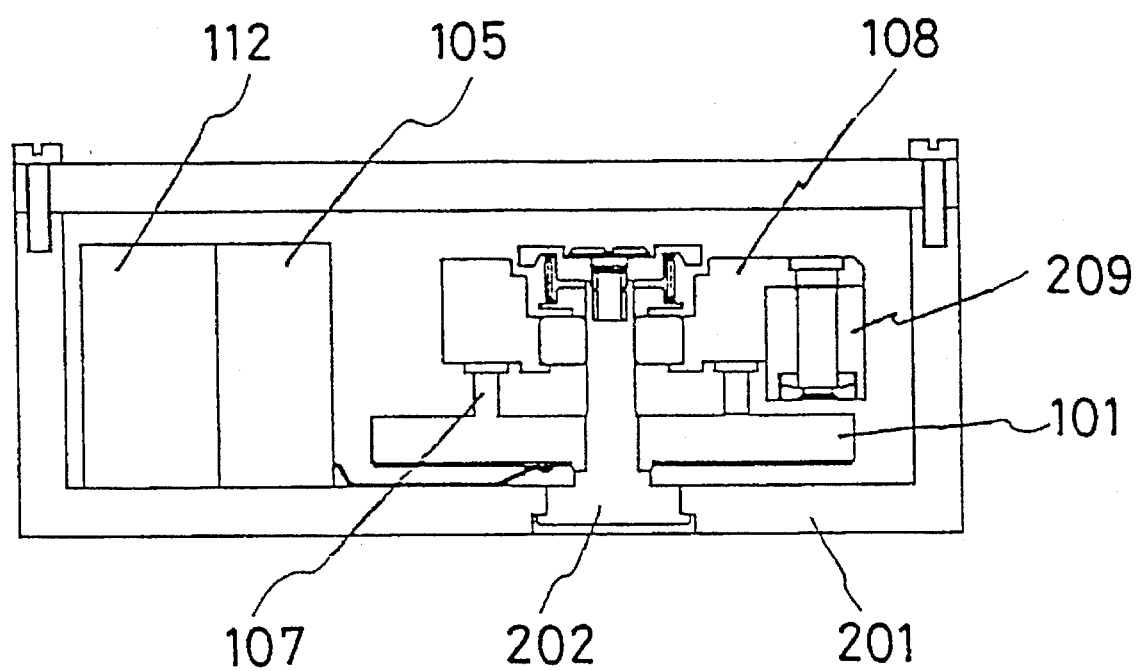
FIG. 16 is a longitudinal sectional view of a vibration generating apparatus equipped with an ultrasonic motor according to an eighth embodiment of the present invention.

In FIG. 16, difference between the eighth and the fifth embodiment of the present invention shown in FIG. 13 is the use of an eccentric weight 209 instead of the outputting shaft 204. The moving member 108 is rotated together with the eccentric weight 209. In response to a preselected signal produced based on externally supplied radio information, or time information, the vibrating member 108 of the ultrasonic motor and the eccentric weight 209 are rotated, so that the information is transferred to the user in the form of vibrations.

(9) NINTH EMBODIMENT

Figure 17:
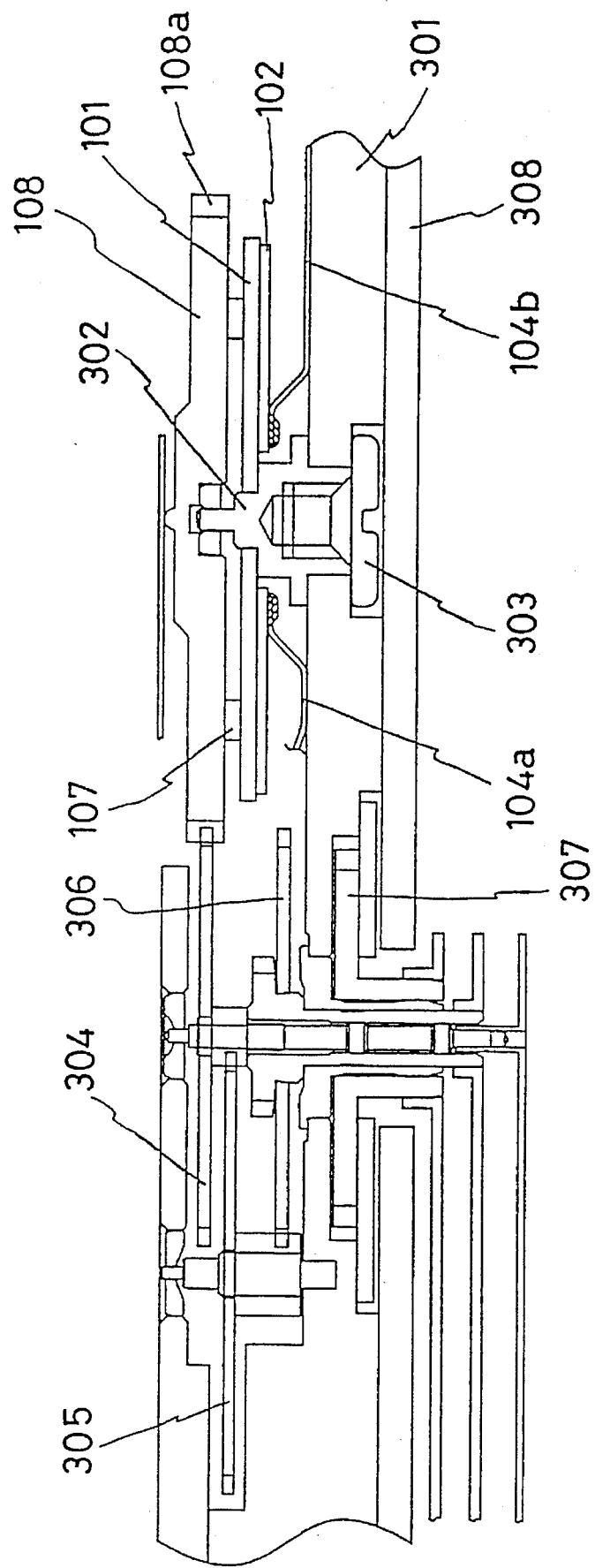
FIG. 17 is a longitudinal sectional view of an electronic timepiece equipped with an ultrasonic motor according to a ninth embodiment of the present invention.
Figure 18:
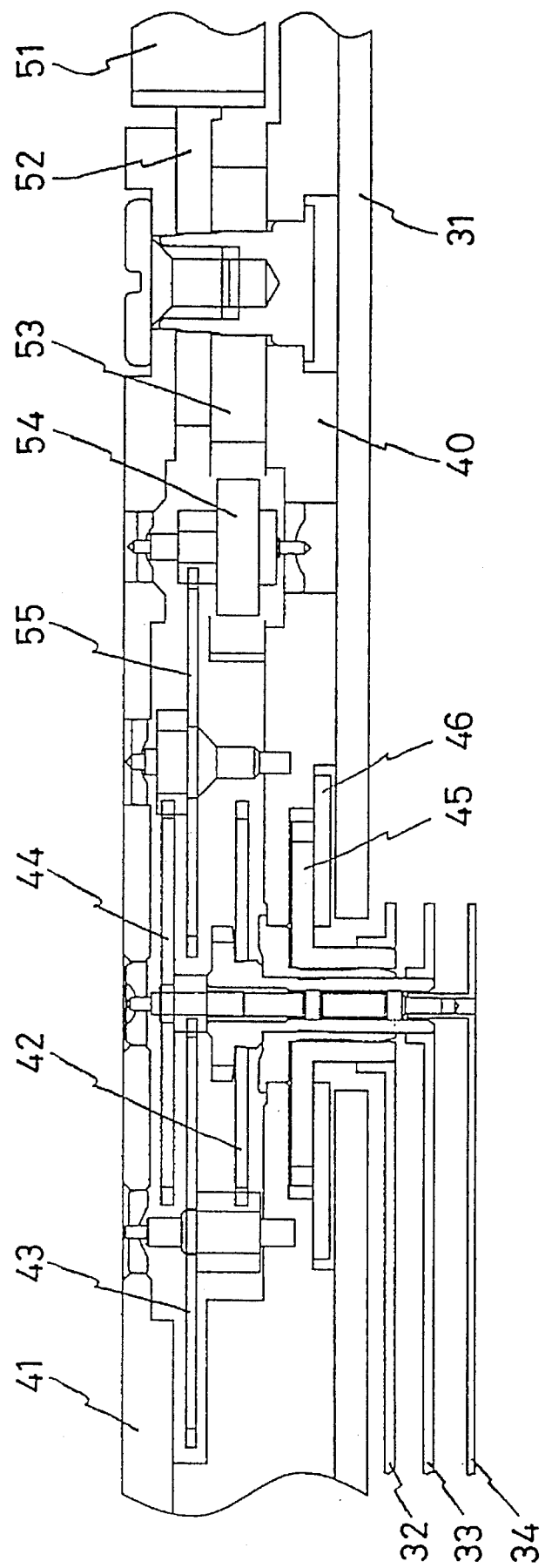
FIG. 18 is a longitudinal sectional view of a conventional electronic timepiece equipped with an ultrasonic motor.

In FIG. 17, the vibrating member 101 having the rear surface to which the piezoelectric element 102 is adhered, is fixed on a guide pin 302, and this guide pin 302 is screwed to a base plate 301 by a stopping screw 303. A plurality of projections 107 are formed on the upper surface of the vibrating member 101. While receiving pressure of the pressure regulating spring 109 by the moving member 108 via this projection 107, the moving member 108 is guided to a tip portion 302a of the guide pin 302 and then is rotatably assembled.

A constant frequency voltage from the drive control circuit (not shown) is applied to the piezoelectric element 102 via either the first circuit means 104a, or the second circuit means 104b, which is bonded on the piezoelectric element 102, whereby the vibrating member 101 is deformed, and then the moving member 108 is rotated at the constant speed by the deformation of the projection 107.

A moving member gear 108a provided at the outer peripheral portion of the moving member 108 causes a fourth wheel 304 to be rotated, and furthermore causes a third wheel 305, a minute wheel 306, a rear wheel of day (not shown), and a hour wheel 307 to be rotated at a constant speed.

When the time period of the frequency voltage applied to the piezoelectric element 102, and the tooth number of the above-explained gears are determined to preselected values, "hour" may be indicated by a hour hand mounted on the hour wheel, "minute" may be indicated by a minute hand mounted on the minute wheel, and "second" may be indicated by a second hand mounted on the fourth wheel.

It should be understood that displays of time information can be performed by employing a plurality of gear trains and the hands as described above, but also may be realized by directly attaching the hands and the pointers to the moving member 108, which may be observed on the side of a dial 308 of FIG. 13, and conversely on the side of the pressure regulating spring 109.

Furthermore, the second hand may be moved in the stepped hand travel for every second, and also may be moved in the continuous mode under control of the motor control circuit by controlling the drive signal outputted from the oscillating driving circuit to the piezoelectric element 102.

Also, it is possible to display a calendar representation such as year, month, and day, a power remaining amount of a battery, environment information, the works and the like, other than the time information representation.

In accordance with the ultrasonic motor of the present invention, such a simple arrangement is made by comprising a piezoelectric element so constructed in that electrode pattern are formed in substantially equiinterval on one plane, the number of said electrode patterns being a multiple of 4, and while two sets of electrode patterns located adjacent to each other are used as one pair, a polarization direction is alternately reversed for each pair of electrode patterns; first circuit means and second circuit means, which shortcircuit every second electrode pattern to form two groups of the electrode patterns; and projections arranged on the vibrating member for every second electrode pattern near boundaries of the electrode patterns, wherein oscillation information about the vibrating member and the piezoelectric element is detected from either the vibrating member, or the electrode pattern; a phase control and an amplification process are carried out by an oscillating driving circuit; and a drive signal is inputted into either the first electrode pattern shortcircuited by the first circuit means, or the second electrode pattern shortcircuited by the second circuit means. There are such advantages that the ultrasonic motor can be rotated in the forward/backward rotating directions, stabilities of the motor performance, and environment reliability of the motor can be improved without such complex control and driving circuits.

What is claimed is:

1. An ultrasonic motor having a moving member frictionally driven by a vibrating wave generated by a piezoelectric element using elastic movement of the piezoelectric element, the ultrasonic motor comprising:

a piezoelectric element having first and second surfaces;

a plurality of electrode patterns disposed on the first surface of the piezoelectric element at nearly equal intervals in a multiple of four, wherein each pair of two neighboring electrode patterns corresponds to a region of the piezoelectric element having an alternately reversed direction of polarization;

first and second circuit means for short-circuiting every other one of the electrode patterns to form two electrode pattern groups;

a vibrating member disposed on the second surface of and electrically connected to the piezoelectric element;

a plurality of projections disposed on the surface of the vibrating member near every other one of the boundaries of the electrode patterns;

oscillation driving circuit means for detecting oscillation data from one of the electrode patterns short-circuited by the first circuit means, performing phase adjustment and amplification of the vibrating wave generated by the piezoelectric element, and inputting a driving signal to one of the electrode patterns short-circuited by the second circuit means;

a moving member movably disposed on the vibrating member; and a pressure-regulating member for urging the moving member into pressure contact with the vibrating member.

2. An ultrasonic motor as claimed in claim 1; further comprising forward and backward rotation signal generating means for generating a forward and backward rotation signal to set a rotary direction for the ultrasonic motor; and switching means for switching between the application of a driving cyclic voltage and the detection of oscillation data for each of the electrode patterns short-circuited by the first circuit means and the electrode patterns short-circuited by the second circuit means through the forward and backward rotation signal from the forward and backward rotation signal generating means.

3. An ultrasonic motor as claimed in claim 2; further comprising a base and a shaft fixed to the base, the vibrating member comprising a disc-shaped elastic material fixed at a central portion thereof to the shaft.

4. An ultrasonic motor as claimed in claim 2; further comprising detecting means for detecting rotary data from the moving member; and a control circuit for controlling the operation of the oscillation driving circuit means to determine the driving conditions of the ultrasonic motor based on the detected data from the detecting means.

5. An ultrasonic motor as claimed in claim 1; further comprising a base and a shaft fixed to the base, the vibrating member comprising a disc-shaped elastic material fixed at a central portion thereof to the shaft.

6. An ultrasonic motor as claimed in claim 1; further comprising detecting means for detecting rotary data from the moving member; and a control circuit for controlling the operation of the oscillation driving circuit means to determine the driving conditions of the ultrasonic motor based on the detected data from the detecting means.

7. An ultrasonic motor having a moving member frictionally driven by a vibrating wave generated by a piezoelectric element using elastic movement of the piezoelectric element, the ultrasonic motor comprising:

a piezoelectric element having first and second surfaces;

a plurality of electrode patterns disposed on the first surface of the piezoelectric element at nearly equal intervals in a multiple of four, wherein each pair of two neighboring electrode patterns corresponds to a region of the piezoelectric element having an alternately reversed direction of polarization;

first and second circuit means for short-circuiting every other one of the electrode patterns to form two electrode pattern groups;

a vibrating member disposed on the second surface of and electrically connected to the piezoelectric element;

a plurality of projections disposed on the surface of the vibrating member near every other one of the boundaries of the electrode patterns;

oscillation driving circuit means for detecting oscillation data from one of an electrode pattern short-circuited by the first circuit means and an electrode pattern short-circuited by the second circuit means, performing phase adjustment and amplification of the vibrating wave generated by the piezoelectric element, and inputting a driving signal to the other of the electrode pattern short-circuited by the first circuit means and the electrode pattern short-circuited by the second circuit means;

a moving member movably disposed on the vibrating member; and a pressure-regulating member for urging the moving member into pressure contact with the vibrating member.

8. An ultrasonic motor as claimed in claim 7; further comprising a base and a shaft fixed to the base, the vibrating member comprising a disc-shaped elastic material fixed at a central portion thereof to the shaft.

9. An ultrasonic motor as claimed in claim 7; further comprising detecting means for detecting rotary data from the moving member; and a control circuit for controlling the operation of the oscillation driving circuit means to determine the driving conditions of the ultrasonic motor based on the detected data from the detecting means.

10. An ultrasonic motor having a moving member frictionally driven by a vibrating wave generated by a piezoelectric element using elastic movement of the piezoelectric element, the ultrasonic motor comprising:

a piezoelectric element having first and second surfaces;

a plurality of electrode patterns disposed on the first surface of the piezoelectric element at nearly equal intervals in a multiple of four, wherein each pair of two neighboring electrode patterns corresponds to a region of the piezoelectric element having an alternately reversed direction of polarization;

first and second circuit weans for short-circuiting every other one of the electrode patterns to form two electrode pattern groups;

vibrating member disposed on the second surface of and electrically connected to the piezoelectric element;

a plurality of projections disposed on the surface of the vibrating member near every other one of the boundaries of the electrode patterns;

oscillation driving circuit means for detecting oscillation data of the vibrating member and the piezoelectric element from the vibrating member, performing phase adjustment and amplification of the vibrating wave generated by the piezoelectric element, and inputting a driving signal to vibrate the vibrating member and the piezoelectric element to one of the electrode pattern short-circuited by the first circuit means and the electrode pattern short-circuited by the second circuit means, the oscillation driving circuit means comprising an inverter for inverting and amplifying an electric signal representative of oscillation data of the vibrating member and the piezoelectric element, the inverter having an output terminal connected in parallel with one of the electrode patters short-circuited by the first circuit means or with one of the electrode patters short-circuited by the second circuit means, a feedback resistor connected in parallel with the inverter for stabilizing the operation point of the inverter, and capacitors connected in series with input and output terminals, respectively, for adjusting phases of a vibrating wave generated by the piezoelectric element;

a moving member movably disposed on the vibrating member; and a pressure-regulating member for urging the moving member into pressure contact with the vibrating member.

11. An ultrasonic motor having a moving member frictionally driven by a vibrating wave generated by a piezoelectric element using elastic movement of the piezoelectric element, the ultrasonic motor comprising:

a piezoelectric element having first and second surfaces;

a plurality of electrode patterns disposed on the first surface of the piezoelectric element at nearly equal intervals in a multiple of four, wherein each pair of two neighboring electrode patterns corresponds to a region of the piezoelectric element having an alternately reversed direction of polarization;

first and second circuit means for short-circuiting every other one of the electrode patterns to form two electrode pattern groups;

a vibrating member disposed on the second surface of and electrically connected to the piezoelectric element;

a plurality of projections disposed on the surface of the vibrating member near every other one of the boundaries of the electrode patterns;

oscillation driving circuit means for detecting oscillation data of the vibrating member and the piezoelectric element from the vibrating member, performing phase adjustment and amplification of the vibrating wave generated by the piezoelectric element, and inputting a driving signal to vibrate the vibrating member and the piezoelectric element to one of the electrode pattern short-circuited by the first circuit means and the electrode pattern short-circuited by the second circuit means, the oscillation driving circuit means comprising an inverter for inverting and amplifying an electric signal representative of oscillation data of the vibrating member and the piezoelectric element, the inverter having an output terminal connected in parallel with one of the electrode patterns short-circuited by the first circuit means or with one of the electrode patterns short-circuited by the second circuit means, a feedback resistor connected in parallel with the inverter for stabilizing the operation point of the inverter, and capacitors connected in series with input and output terminals, respectively, for adjusting phases of a vibrating wave generated by the piezoelectric element;

forward and backward rotation signal generating means for generating a forward and backward rotation signal to set a rotary direction for the ultrasonic motor;

switching means for switching between the application of a driving cyclic voltage and the detection of oscillation data for each of the electrode patterns short-circuited by the first circuit means and the electrode patterns short-circuited by the second circuit means through the forward and backward rotation signal from the forward and backward rotation signal generating means;

a moving member movably disposed on the vibrating member; and a pressure-regulating member for urging the moving member into pressure contact with the vibrating member.

12. An ultrasonic motor as claimed in claim 11; further comprising a base and a shaft fixed to the base, the vibrating member comprising a disc-shaped elastic material fixed at a central portion thereof to the shaft.

13. An ultrasonic motor as claimed in claim 11; further comprising detecting means for detecting rotary data from the moving member; and a control circuit for controlling the operation of the oscillation driving circuit means to determine the driving conditions of the ultrasonic motor based on the detected data from the detecting means.

14. An ultrasonic motor as claimed in claim 11; further comprising a base and a shaft fixed to the base, the vibrating member comprising a disc-shaped elastic material fixed at a central portion thereof to the shaft.

15. An ultrasonic motor as claimed in claim 11; further comprising detecting means for detecting rotary data from the moving member; and a control circuit for controlling the operation of the oscillation driving circuit means to determine the driving conditions of the ultrasonic motor based on the detected data from the detecting means.

16. An ultrasonic motor having a moving member frictionally driven by a vibrating wave generated by a piezoelectric element using elastic movement of the piezoelectric element, the ultrasonic motor comprising:

a piezoelectric element having first and second surfaces;

a plurality of electrode patterns disposed on the first surface of the piezoelectric element at nearly equal intervals in a multiple of four, wherein each pair of two neighboring electrode patterns corresponds to a region of the piezoelectric element having an alternately reversed direction of polarization;

first and second circuit means for short-circuiting every other one of the electrode patterns to form two electrode pattern groups;

a vibrating member disposed on the second surface of and electrically connected to the piezoelectric element;

a plurality of projections disposed on the surface of the vibrating member near every other one of the boundaries of the electrode patterns;

oscillation driving circuit means for detecting oscillation data of the vibrating member and the piezoelectric element from the vibrating member, performing phase adjustment and amplification of the vibrating wave generated by the piezoelectric element, and inputting a driving signal to vibrate the vibrating member and the piezoelectric element to one of the electrode pattern short-circuited by the first circuit means and the electrode pattern short-circuited by the second circuit means;

a moving member movably disposed on the vibrating member;

a pressure-regulating member for urging the moving member into pressure contact with the vibrating member;

an output shaft connected to be driven by the moving member; and power transmitting means for transmitting output torque from the output shaft to a load.

17. An ultrasonic motor as claimed in claim 16; further comprising detecting means for detecting rotary data from the moving member; and a control circuit for controlling the operation of the oscillation driving circuit means to determine the driving conditions of the ultrasonic motor based on the detected data from the detecting means.

18. An ultrasonic motor as claimed in claim 16; further comprising forward and backward rotation signal generating means for generating a forward and backward rotation signal to set a rotary direction for the ultrasonic motor; and switching means for switching between the application of a driving cyclic voltage and the detection of oscillation data for each of the electrode patterns short-circuited by the first circuit means and the electrode patterns short-circuited by the second circuit means through a forward and backward rotation signal from the forward and backward rotation signal generating means.

19. An analog electronic timepiece comprising:

a piezoelectric element having first and second surfaces;

a plurality of electrode patterns disposed on the first surface of the piezoelectric element at nearly equal intervals in a multiple of four, wherein each pair of two neighboring electrode patterns corresponds to a region of the piezoelectric element having an alternately reversed direction of polarization;

first and second circuit means for short-circuiting every other one of the electrode patterns to form two electrode pattern groups;

a vibrating member disposed on the second surface of and electrically connected to the piezoelectric element;

a plurality of projections disposed on the surface of the vibrating member near every other one of the boundaries of the electrode patterns;

oscillation driving circuit means for detecting oscillation data of the vibrating member and the piezoelectric element from the vibrating member, performing phase adjustment and amplification of the vibrating wave generated by the piezoelectric element, and inputting a driving signal to vibrate the vibrating member and the piezoelectric element to one of the electrode pattern short-circuited by the first circuit means and the electrode pattern short-circuited by the second circuit means;

a moving member movably disposed on the vibrating member;

a pressure-regulating member for urging the moving member into pressure contact with the vibrating member;

means for generating a time base reference signal;

timepiece circuit means receptive of the time base reference signal for producing a time signal representative of time;

motor driving circuit means responsive to the time signal for outputting a driving signal to the piezoelectric element of the ultrasonic motor for driving the ultrasonic motor; and display means driven by the ultrasonic motor for displaying time.

20. An analog electronic timepiece as claimed in claim 19; further comprising forward and backward rotation signal generating means for generating a forward and backward rotation signal to set a rotary direction for the ultrasonic motor; and switching means for switching between the application of a driving cyclic voltage and the detection of oscillation data for each of the electrode patterns short-circuited by the first circuit means and the electrode patterns short-circuited by the second circuit means through a forward and backward rotation signal from the forward and backward rotation signal generating means.

* * * * *